N. F. KOCHKA.
MONEY OR LIKE WRAPPER OR BAND.
APPLICATION FILED JULY 19, 1920.
1,435,165. Patented Nov. 14, 1922.
3 SHEETS—SHEET 2.
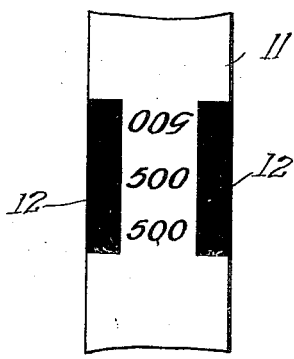
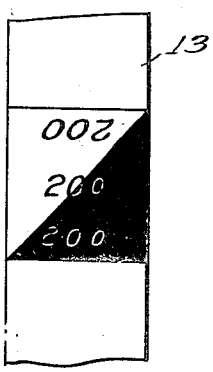
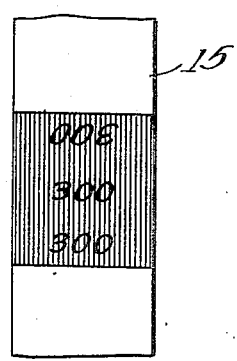
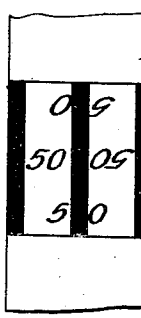
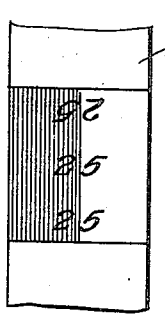
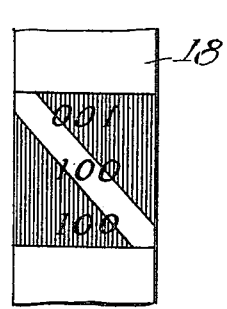
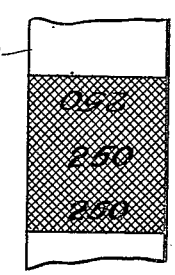
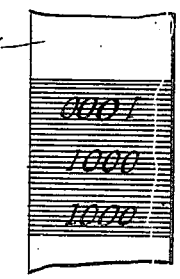
Witnesses
Harry R. Leohite
W. R. Kilroy
Inventor
Norbert F. Kochka
By Shie & Shie
Attys

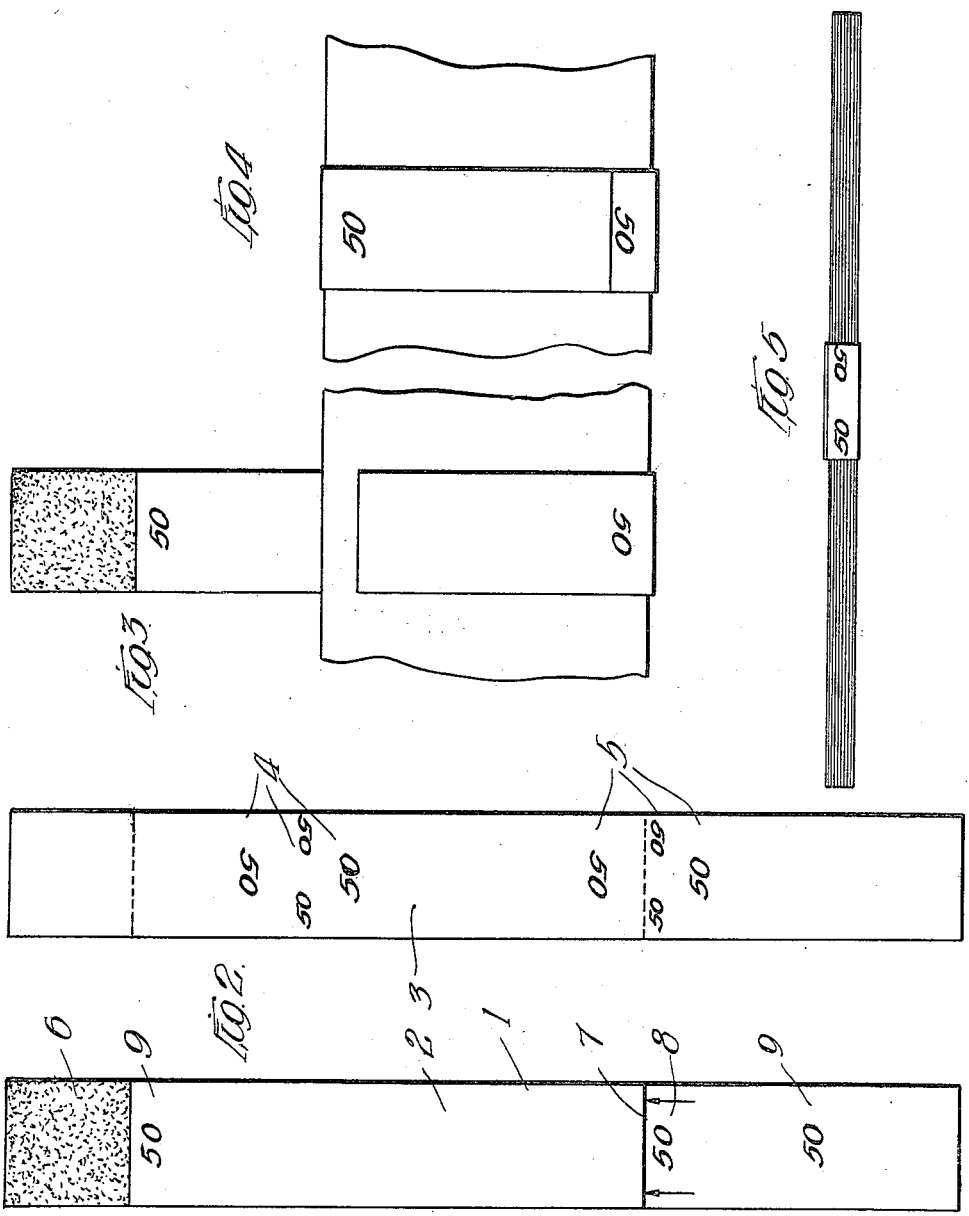

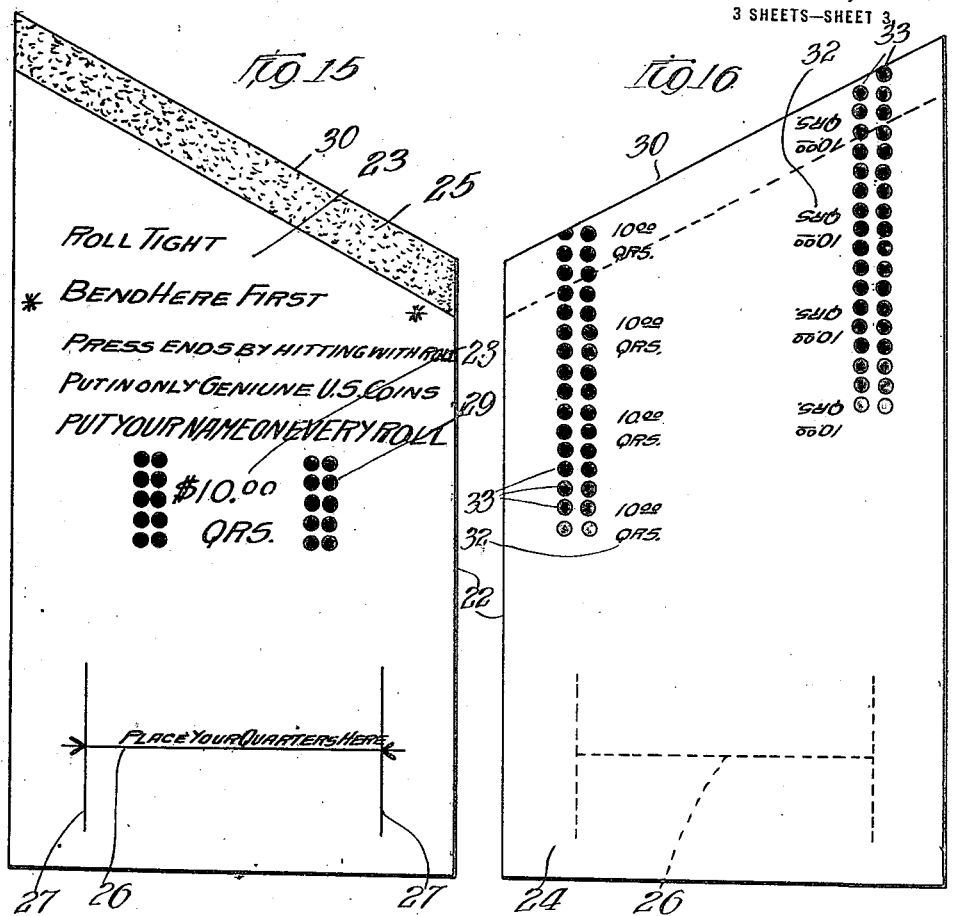

Patented Nov. 14, 1922.

1,435,165

UNITED STATES PATENT OFFICE.

NORBERT F. KOCHKA, OF CHICAGO, ILLINOIS.

MONEY OR LIKE WRAPPER OR BAND.

Application filed July 19, 1920. Serial No. 397,236.

*To all whom it may concern:*

Be it known that I, NORBERT F. KOCHKA, a citizen of the United States, residing at Chicago, in the county of Cook and State of Illinois, have invented certain new and useful Improvements in a Money or Like Wrapper or Band, of which the following is a description.

My invention belongs to that general class of devices known as money wrappers or bands, and relates particularly to a strap, band or wrapper for containing currency or coin. The invention has among its objects the production of a device of the kind described that is simple, convenient, efficient and satisfactory for use wherever found applicable. More particularly it has as an object the production of a device of the kind described which will save time and work and prevent mistakes. Many other objects and advantages of the device herein shown and described will be obvious to those skilled in the art from the disclosure herein given.

To this end my invention consists in the novel construction, arrangement and combination of parts herein shown and described and more particularly pointed out in the claims.

In the drawings, wherein like reference characters indicate like or corresponding parts, Figure 1 is a plan view of one side of the currency band;

Figure 2 is a similar view of the opposite side;

Figure 3 is a plan view of the same band and a portion of a package of currency illustrating the application of the band;

Figure 4 is a similar view showing the band secured;

Figure 5 is an edge view of the secured binder and wrapper;

Figures 6 to 14 illustrate various methods of marking the wrapper to distinguish the different denominations for which the wrapper is applicable;

Figure 15 is a plan view of a coin wrapper;

Figure 16 is a similar view of the outside of the same;

Figure 17 is a view in elevation of a wrapped stack of coins;

Figure 18 is an end view of the wrapped stack; and

Figures 19, 20 and 21 illustrate different methods of marking the wrapper.

It is customary in banks and various establishments handling money of various denominations to arrange the bills or currency in bundles or stacks and wrap or bind the same together for convenience in handling, thereby avoiding considerable handling of separate bills or coins. Generally bundles of ones, twos, fives, etc., of various denominations are wrapped in bundles, for example, 50 ones or 10 fives, or 100 ones or 100 fives, or whatever the desired amounts are to be, and a band arranged around the same securing the bundle together, which band generally has the amount printed on the outside indicating the value of the bundle. Coins are likewise stacked and wrapped generally in multiples of a dollar, 2 dollars, 10 dollars, or whatever it may be, so that the same is more easily handled and mistakes to a large extent obviated. With the various bands, wrappers, straps, etc., now in use, however, the clerk or teller handling the money, that is to say wrapping the same or binding it up, must be particularly careful to secure the right binder or wrapper upon which, on the face to be the outside of the package, the amount is usually printed. Assuming that he uses a band around a stack of currency, he places the band upside down and lays the pile of currency thereon and thence bends the strips over the top and secures the ends together. If he has laid a wrong strip down the amount being face down and not apparent, he does not see the error until he bends the same up, and if his attention is concentrated in placing the currency in the center of the strip or at the proper point, so that when the ends are turned up and gummed or pinned together, he may not even then notice that he has made a mistake. It is desirable that he place the stack or bundle of currency at a particular point on the band, as otherwise the denominations and amount in the package will not show properly on the outside, it being intended to so print the denominations on the outside that the same may be seen from either side or face, as well as from the edge of the bundle, if the bundles are set on edge in a drawer or case. Likewise sometimes he may read 50 when the denomination is 500 or 5000, or vice versa, and it is desirable to so distinguish the several wrappers that his attention will be immediately called to an error. The remarks set forth in reference to the currency or bills apply equally to coins.

With my improved strip or wrapper I aim to accomplish a saving of time, as well as to avoid mistakes with consequent loss. I provide means for indicating the proper placing of the currency or coins on the strip, whereby when the bundle is wrapped and the ends of the wrapping secured, the figures on the outside will be in proper relation to the contained money as to be clearly seen, and in such a manner that no stress or strain is on the bundle or wrapper. I also prefer to provide means for indicating on the inner face the value which the bundle represents, and in addition, if desired, there may be employed my improved method of differentiating or identifying the various bands or wrappers for various values.

Referring to the drawings, 1 represents a strap, band, or wrapper, to be employed for wrapping currency or other papers or documents of value, for example, bonds, 2 and 3 being the inner and outer faces respectively thereof. On the outer face 3, I prefer to provide suitable indicating means or characters for indicating the value of the contained currency or the like, as for example, as indicated at 4 or 5, the same being both preferably employed so that the value will be indicated on both edges and on both faces adjacent each edge. On the opposite or inner side, or face, I place a line 7, or its equivalent, to indicate where the currency is to be centered. This may be printed, or otherwise applied to the band and any equivalent means for indicating the point at which the money is to be placed and the band is to be turned up or folded over may be employed. There is also preferably provided one or more characters, as indicated at 8 and 9, corresponding with the characters on the outside for indicating the value. If a gummed binder is employed, the same is preferably gummed as indicated at 6, the method of securing the ends of the wrapper together, however, forming no part of the present invention, as they may have paste applied thereto or a pin employed. After the bundle has been placed on the binder or wrapper and centered by means of the line 7, the one end, for example, the adjacent end, is turned over the edge and on the top of the bundle as indicated in Figure 3, after which the other end is turned over the edge and down and on the first mentioned edge and secured thereto by means of the gummed end or by a pin or any other fastening means. It will be noted by referring to Figure 1 that there is plainly displayed before the eye of the clerk or teller the value indicated on the wrapper, so that before wrapping it will be obvious to him that he has employed a proper wrapper, if such is the case, or that he has taken the wrong wrapper. Likewise, the wrappers if face down on his desk or table or in a drawer need not be turned over to see the denomination indicated as the same is clearly apparent from either side. It will thus be seen that not only is the bundle so centered on the wrapper with the amount of denomination of the wrapper shown, but that when the wrapper is secured, the denomination on the wrapper clearly shows on both sides or faces of the bundle and on the edges, the centering line bringing the folding of the wrapper or binder so that the denomination is accurately centered at the edges of the bundle.

In Figures 6 to 14, I have indicated how the denominations may be indicated on the binder so that various values will be quickly apparent to the trained eye and the chance for error reduced. As shown in Figure 6, 11 represents a binder which in addition to the characters indicating the value of the bundle, has one or more distinguishing marks such as 12—12 of a desired color, size or shape, which, regardless of the printed value or denomination, will in itself indicate the value and check the reading of the denomination. In other words, in the particular band illustrated it will indicate 500 and not 5, 50, 5000 or any other value having the number 5 in it. In the remaining figures, 13, 15, 16, 17, 18, 19, 20 and 21 show strips with various other styles of indicating values, it being understood that these are merely representative or illustrative of various combinations for indicating values, the same not being limited to the particular valuation used in combination therewith. Various other styles, arrangements, shapes, sizes, and the desired combinations of colors may be provided. These may be placed on one or both sides of the wrapper or binder, but ordinarily on the outside.

As previously mentioned, the binders or wrappers just described are suitable for currency, bills, bonds, or the like. The same results are accomplished by a similar wrapper for coins, such a wrapper being shown in Figures 15 to 21. Referring to these figures, 22 represents a sheet, 23—24 the opposite sides thereof, which wrapper may be gummed as at 25 for convenience in securing, if desired. In this instance, on the inner side 23 I prefer to place a line 26 for convenience in centering the stack of coins thereon, and lines 27 or their equivalents for centering the same lengthwise as well as serving as a check on the amount in the stack. I also prefer to indicate at one or more points on the inner face the denomination, as shown at 28, and there may also be provided any desired arbitrary symbols or characters, for example 29, for indicating the same denomination or value. Upon the outer side 24 I prefer to show the denominations as indicated at 32, together with the arbitrary symbols or characters 33. The arbitrary characters on the outside of the sheet are so arranged that when the coin stack is rolled and the ends turned in as shown in Figs. 17 and 18, the denomination and amount will be shown or indicated at many points. By employing the arbitrary characters 33 as described, they clearly show at the ends of the roll. The gummed end may be cut straight or as preferred. As illustrated, the same is cut at an angle as indicated at 30. In Figs. 19, 20 and 21 I have shown other arbitrary characters or symbols for denoting different denominations, it being understood that these may be of various sizes, shapes, colors, arrangements, and represent any desired data. In Fig. 19 sheet 35 is provided with the short bars 36, while Fig. 20 shows the sheet 37 provided with lines 38 running lengthwise. In Fig. 21, 39 represents the sheet and 40 a solid wide bar.

The advantages of the construction will be obvious. The clerk or teller does not have to estimate the proper distance and point to place the bundle, as when laid on the guiding line the ends of the strap will come together at the proper point on the opposite side without any adjustment, the work being done mechanically without any mental effort. The strap may be folded evenly and the denominations which are printed on the strip, their location being governed by the line, will show in prominent figures when the bundle is wrapped on the top and bottom and both edges, so that the amount of the package can be read from all directions. By placing the denominations of the package on the back of the strip, the same is always before the person making up the package, and he does not have to turn over the strap or guess whether he is using the right strap, but he has it before him and will unconsciously note it, avoiding mistakes as well as saving time, and many times preventing loss. Wrong straps or binders are frequently put around currency because it is wrapped blindly. The straps printed only on one side must be face up or turned over in order to show the denomination, and then turned back or over when used, thereby requiring unnecessary work. The straps may be colored, partially colored, or plain. They may be gummed or ungummed, of the desired length or width, and the line may be printed at the desired point depending upon the size of the package and binder. The strips may be of paper, cloth, or any other equivalent material. Obviously, such other material or matter may be placed upon the straps, bands or wrappers as may be desired, this being immaterial in so far as the present invention is concerned.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A wrapping band of the kind described consisting of a sheet of suitable material having means at one side thereof for indicating the proper centering of the articles to be wrapped therewith, and with like means on both faces of the sheet for indicating the value of the wrapped package.

2. A money or like wrapper of the kind described consisting of a strip of suitable material provided with a line thereon for indicating the proper location of the articles to be wrapped therein, and the folding point on the strip, and having means on the said side of the slip for indicating the value of the wrapped contents.

3. A wrapping device of the kind described consisting of a strip of material provided with like characters on both faces thereof for indicating the value of the objects retained by the wrapper.

4. A money wrapper of the kind described, consisting of a strip of material provided with means on the outer face for indicating the value of the contents wrapped by the band at points on either face of the package and at the edges thereof, and means at the opposite face of the sheet for indicating the centering of the money on the sheet prior to the folding thereof, said means so disposed relative the indicating means on the opposite side that said indicating means will be properly aligned at the edges of the package, and means on said sheets at said second mentioned face with said centering indicating means for verifying the characters on the outside face of the sheet.

5. A money wrapper of the kind described, consisting of a strip of material provided with means on the outer face for indicating the value of the contents wrapped by the band at points on either face of the package and at the edges thereof, and means at the opposite face of the sheet for indicating the centering of the money on the sheet prior to the folding thereof, said means so disposed relative the indicating means on the opposite side that said indicating means will be properly aligned at the edges of the package.

In testimony whereof, I have hereunto signed my name in the presence of two subscribing witnesses.

NORBERT F. KOCHKA.

Witnesses:
JOHN T. SLAVIN,
CHARLES KLIOKA.